H. IKE.
GARDEN IMPLEMENT.
APPLICATION FILED JULY 20, 1918.
1,301,442.
Patented Apr. 22, 1919.
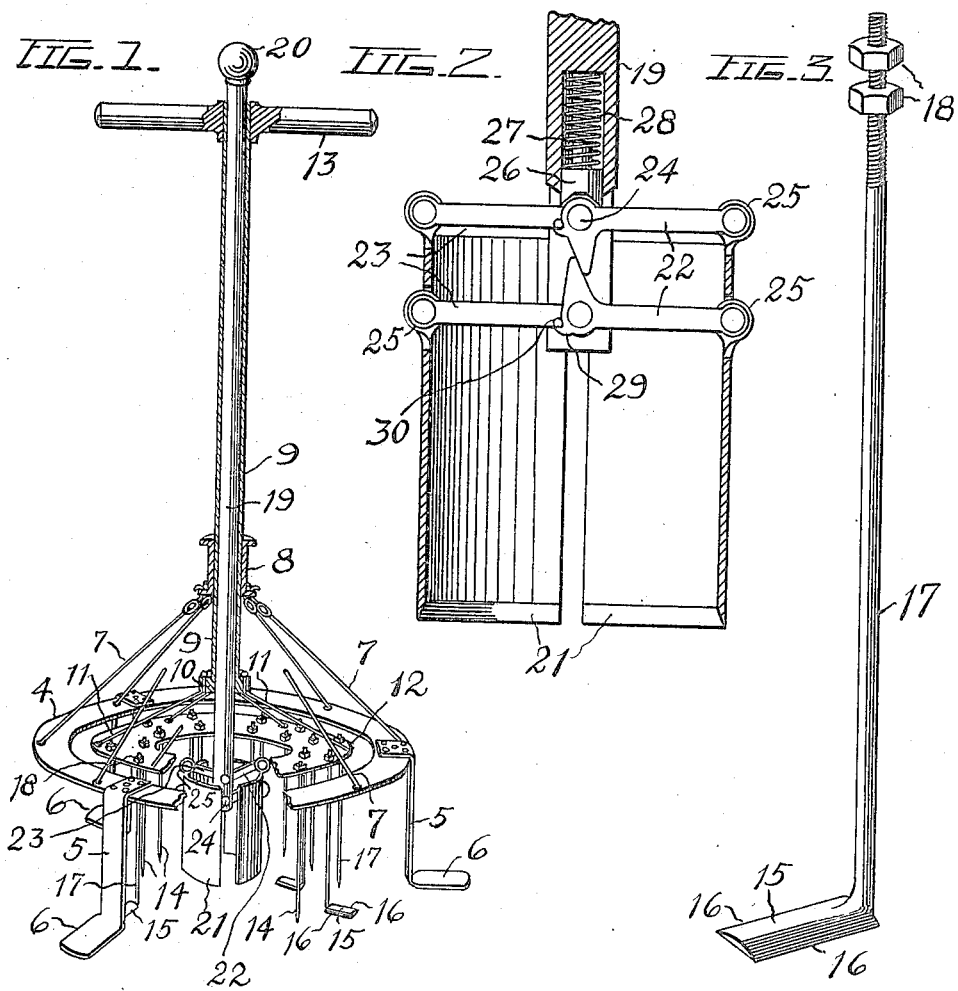
INVENTOR:
Hiyakumatsu Ike.
By His Atty.
Edward M. Kojima

UNITED STATES PATENT OFFICE.

HIYAKUMATSU IKE, OF BUENA PARK, CALIFORNIA.

GARDEN IMPLEMENT.

1,301,442.  Specification of Letters Patent.  Patented Apr. 22, 1919.

Application filed July 20, 1918. Serial No. 245,800.

*To all whom it may concern:*

Be it known that I, HIYAKUMATSU IKE, a subject of the Emperor of Japan, residing at Buena Park, in the county of Orange and State of California, have invented a new and useful Garden Implement, of which the following is a specification.

This invention relates to improvements in garden implements, the object of the invention being to provide a standard to support a revoluble and centrally disposed member which is provided with a plurality of garden rake and harrow teeth adapted for cultivating and tilling the ground, and a handle for manual operation whereby the centrally disposed member may be operated with a turning movement and the cultivating elements actuated in a radial movement around the individual plant, while the soil in close proximity thereto remains undisturbed.

Another object of this invention is to provide an improved implement which may be employed as a hand-operated device to chop or cut out blocks in a row of standing plants. The hoe and rake elements are so constructed as to readily free the trash and vegetable growth upon reversal of the turning movement, and at the same time will evenly distribute the soil and vegetation on either side of the row.

A further object is to provide adjusting means to accommodate the device to the area to be cultivated, and to the size and character of the plant, being especially valuable in the cultivation of celery, beets, lettuce, and pepper plants.

Another object of this invention is to provide means for shielding and protecting the plant during the cutting, chopping, and hoeing operations, and to provide means for loosening the soil in intimate contact with the roots of the plants without displacement thereof.

With these and other objects in view, my invention resides in the novel arrangement and construction of parts as are hereinafter more fully described and claimed, a practical embodiment of the invention being shown in the accompanying drawings, in which:

Figure 1 is a perspective view of a garden implement constructed in accordance with my invention, showing certain of the parts in section. Fig. 2 is a sectional detail view of the plant protector. Fig. 3 is a perspective detail view of a cultivating element.

Referring to the drawings, the annular member 4 has depending therefrom, the vertical standards 5, serving to support the annular member, and provided with angular and radial extending foot rests 6, upon which the operator's feet may be placed to maintain the standard in operative position in use. From the annular member 4, a series of supporting rods 7 extend upward to the bearing member 8 which is carried in axial alinement with member 4, and has journaled therein, the revoluble shaft 9, having fixed to its bottom end 10, a series of supporting rods 11, carrying the annular and horizontally disposed disk 12, and at the opposite end the transversely disposed handles 13, which may be grasped by the operator to give the disk member 12 a rotary movement. A plurality of cultivator elements consisting of rake teeth 14, and cutters 15, are adjustably and detachably secured to the annular disk member 12, and are disposed so as to agitate the soil and cut out grass and other vegetable growth around the plant, and to otherwise operate upon a row of plants for effective cultivation thereof. The cutters 15, are provided with oppositely disposed and sharpened edges 16, effective to cut the vegetable growth on consecutive movements of the supporting disk member 12, and are adjustable being provided with threaded shafts 17, having clamping nuts 18 on either side of the disk.

In use, the rake teeth may be set to penetrate the soil to a greater depth than the cutters, the adjustment being made by turning the clamping nuts. The teeth elements are thus effective to stir up the soil, while the cutters are effective to evenly distribute the loosened soil around the plant, and more thorough cultivation is attained in a third of the time than would be required to accomplish the same with a hoe.

To protect the plant or plants while the chopping strokes are made, I have provided a centrally disposed shaft 19, slidingly mounted in and independently revoluble relative to shaft 9, and provided on its upper end with a handle 20 screwed thereto. At the bottom the oppositely disposed and semicircular shield members 21, are connected by parallel links 22 and 23, the arrangement being such, that as the handle 20 is pressed downward, members 21 are forced relatively toward each other. The relative movement of members 20 tends to loosen the soil in proximity to the plant, and without displacing the roots of the plant. At the same time a protective shield is formed for the plant, avoiding possible injury from the cutters and rake elements. The bottom end of shaft 19 is slotted to receive the link members 22, connected to pivotal pins 24, the opposite ends of the links being connected to lugs 25 formed integrally with shield members 21. When forced into the soil, the same will tend to maintain the shield members in protective position around the plant. Upon raising the shaft 19, the shield members 21 will be forced relatively apart in a limited movement, being actuated by a plunger 26 in engagement with the upper links 22, 23. Plunger 26, slides in a socket 27, in shaft 19, and is actuated by a spring 28, interposed between the end of the plunger and the end of the socket. Link members 22 are provided with lugs 29, which, in the fully extended position of shield members 21, engage with pins 30, on links 23, thereby limiting the movement of the parallel link members.

In use, the device is placed in position over a plant or over a particular section of a row of plants; the operative parts having been previously adjusted in accordance with the work to be executed. The operator, after placing his feet upon one or more of the foot rests to maintain the device in position, forces the bar or shaft 19 downward, thus forcing the shield members 21 into engagement with the soil and in position to protect the plant. Through the handles 13, the operator will manipulate the raking and cutting elements in a turning movement to cut out and destroy the vegetable growth in proximity to the plant, and to suitably stir and loosen the soil for cultivation. The device will perform rapidly and well the functions of a cotton chopper, a grass cutter, a beet thinning machine, a garden hoe, a rake, a cultivator, and analogous tools and implements. The movement given the raking and cutting elements, tends to prevent accumulation thereon of plant growth and refuse which may be encountered. After sufficient manipulation of the revoluble cultivating elements, the operator will grasp the handle 20, and lift upward thereon to release the shield members from engagement with the soil. The handle 20 being screwed to shaft 19 is detachable and removable whereby the shield members with their supporting shaft are removable and may be withdrawn from sleeve 3 when handle 20 has been detached from the upper end of shaft 19. When used upon a standing row of plants, the movement of the cutting elements is at a substantially right angle with the row of plants, and the plants coming in the path of the cutting blades, are cut out in blocks.

While the device shown and described is well adapted to serve the purposes for which it is intended, it is to be understood that the invention is not limited to the precise construction shown in the drawings, but includes within its purview such minor changes and alterations, as may fall within the scope of the appended claims.

What is claimed is:

1. In a garden implement, a plant shield having opposed shield members, a central shaft having a socket in the end thereof, parallel links connecting the shield members with the central shaft, a plunger working in the socket and operating against the parallel links, a spring within the socket and actuating the plunger, stops on the links to limit the movement thereof, an independently revoluble and tubular shaft member disposed concentrically upon the central shaft, handles fixed to the tubular shaft member, a disk suspended from the tubular shaft member, soil tilling elements carried by the disk and movable in circular paths around the shield members, and a supporting standard for the tubular shaft member.

2. In a garden implement, a frame, standards depending therefrom, foot rests on the standards, a bearing block superposed above the frame, a revoluble shaft journaled in the bearing block, a disk carried by the revoluble shaft, cultivating elements adjustably secured to the disk, and a handle at the upper end of the revoluble shaft; said shaft being operated thereby in a rotary movement.

3. In a garden implement, a plant shield comprising two oppositely disposed and semicircular shield members, a central and axial shaft, parallel links connecting the shield members, with the axial shaft, and adapted to force the shield members together when forced downward, a socket within the end of the shaft, a plunger working in the socket and operating against the parallel links to force the shield members apart, and a spring within the socket and adapted to actuate the plunger.

In testimony whereof, I have hereunto affixed my signature this 26th day of June, in the year 1918.

HIYAKUMATSU IKE.

In presence of—
  FREDERIC M. KEENEY,
  J. W. MASTER.